United States Patent

Kubota

Patent Number: 5,078,554
Date of Patent: Jan. 7, 1992

[54] DRILL

[76] Inventor: Masao Kubota, 22-7, Narimasu 2-chome, Itabashi, Japan

[21] Appl. No.: 573,123
[22] PCT Filed: Jan. 24, 1990
[86] PCT No.: PCT/JP90/00081
§ 371 Date: Sep. 14, 1990
§ 102(e) Date: Sep. 14, 1990
[87] PCT Pub. No.: WO90/08614
PCT Pub. Date: Aug. 9, 1990

[30] Foreign Application Priority Data

Jan. 24, 1989 [JP] Japan ............................ 1-13045

[51] Int. Cl.$^5$ ............................................. B23B 51/02
[52] U.S. Cl. ................................. 408/230; 408/227
[58] Field of Search ............... 408/144, 227, 229, 230, 408/715

[56] References Cited

U.S. PATENT DOCUMENTS

| | | | |
|---|---|---|---|
| 546,041 | 9/1895 | Tyberg | 408/230 |
| 4,222,690 | 9/1980 | Hosoi | 408/144 X |
| 4,688,972 | 8/1987 | Kubota | 408/227 X |

FOREIGN PATENT DOCUMENTS

| | | | |
|---|---|---|---|
| 39873 | 3/1977 | Japan | 408/715 |
| 35366 | 8/1983 | Japan | |
| 160009 | 9/1983 | Japan | |
| 178110 | 8/1986 | Japan | |
| 45504 | 2/1989 | Japan | 408/230 |
| 674840 | 7/1979 | U.S.S.R. | 408/230 |
| 1042905 | 9/1983 | U.S.S.R. | 408/227 |
| 1437160 | 11/1988 | U.S.S.R. | 408/230 |

Primary Examiner—Steven C. Bishop
Attorney, Agent, or Firm—Staas & Halsey

[57] ABSTRACT

A drill, which is excellent in sharpness and strength, capable of preventing burrs at an exit of a machined bore and of suppressing an excessive enlargement of the machined bore size, and is low in manufacturing costs, and easy te re-grind.

A rake face (30) is provided to improve sharpness of a single chisel edge (3) formed between the tip of the drill and a first main cutting edge (1), and a non-chisel-edge-forming portion ($B_1OB_2$) is provided between the drill tip end and a second main cutting edge (2) to improve strength of the drill. A margin portion (5), provided in a peripheral portion of the drill tip end at the side close to the first main cutting edge and having a non-cutting-edge-forming portion (11), is disposed in slide contact with an inner peripheral surface of a machined bore to achieve a guide shoe function, thereby improving, during drilling process, stability of an outer peripheral cutting edge (6) formed in the peripheral portion of the drill tip end at the side close to the second main cutting edge. The outer peripheral cutting edge extends at an acute angle relative to the outer periphery of the drill as seen from the axial direction of the drill, to cause machined material to be directed to the inward of the machined bore, thereby preventing burrs. The rake face associated with the chisel edge is comprised of a twisted curved surface whose lead is the same as those of rake faces (10) of various drill portions, making it easy to produce the drill and perform re-grinding.

11 Claims, 5 Drawing Sheets

FIG. 10

DRILL

TECHNICAL FIELD

The present invention relates to a drill capable of efficient and accurate drilling, and more particularly, to a drill having a variety of cutting edges which are respectively formed into appropriate shapes for efficient and accurate drilling.

BACKGROUND ART

Improved sharpness of a drill, prevention of occurrences of burrs at the exit side of a machined bore (at that portion at which the machined bore opens to a drilled face), suppression of an enlarged amount of the bore size attributable to drilling (prevention of an excessive increase of the machined bore), assurance of strength of the drill, etc. are important in drilling.

Conventionally, to improve the sharpness of a chisel edge provided at the distal end of a drill, i.e., the sharpness of the drill, a primary or secondary face having a positive rake angle is formed in a chisel-edge-forming portion of the drill (see, U.S. Pat. No. 4,688,972). In this case, however, the thickness of the drill becomes small at the chisel-edge/rake-face-forming portion of the distal end of the drill. Thus, there occurs a drawback such that the strength and rigidity of that drill portion become insufficient.

It is considered that burrs are caused by the flow of machined material (chip) flowing in the radial direction from the inward of the machined bore to the outward thereof. Thus, it appears desirable to provide a cutting edge at a peripheral portion of the distal end of the drill, so as to cause the flow of machined material to be directed toward the inward direction. However, during the course of drill production, it is impractical to machine a drill to be produced in such a manner that the drill is simultaneously formed at its distal end with both of a chisel edge face and an outer peripheral cutting edge, because interference can occur between a tool for forming the rake face and a tool for forming the cutting edge.

To suppress the excessive enlargement of the bore size resulting from the drilling, conventionally employed is a drill having a pair of cutting edges which have the same shape and are well-balanced with each other, or a drill having a single cutting edge and a guide shoe.

Conventionally, various countermeasures have been taken for the sake of improvement of the drill sharpness, prevention of burrs, and suppression of excessive enlargement of the bore size, as mentioned above. However, in the industrial production of drills, difficulties have been encountered in adopting all the countermeasures simultaneously. Particularly, it is difficult to provide the resultant drills with an adequate strength.

DISCLOSURE OF THE INVENTION

An object of the present invention is to provide a drill which is excellent in sharpness and strength.

Another object of the present invention is to provide a drill capable of preventing occurrences of burrs at an exit side of a machined bore.

A still another object of the present invention is to provide a drill capable of suppressing an excessive enlargement of a bore size attributable to machining.

A further object of the present invention is to provide a drill which is low-priced in production costs and is easy to effect re-grinding, to thereby make it possible to always maintain the drill in appropriate conditions.

In order to achieve the above-mentioned objects, a drill of the present invention comprises first and second main cutting edges which are respectively formed in a distal end of the drill. These cutting edges are the same with each other in a half point angle and in an offset amount relative to the center of the drill. The drill further comprises a single chisel edge formed in the distal end of the drill and extending only between the center of the distal end of the drill and one of the first and second main cutting edges, and a rake face formed in the distal end of the drill in association with the chisel edge.

Preferably, a non-chisel-edge-forming portion is provided between the center of the distal end of the drill and the other main cutting edge. A peripheral portion of the distal end of the drill has a drill distal end surface thereof provided at a side thereof close to the one main cutting edge with a non-cutting-edge-forming portion, and has its outer peripheral surface which is disposed in slide contact with an inner peripheral surface of a machined bore. The non-cutting-edge-forming portion is disposed at a location receding from the one main cutting edge in a direction along which the drill rotates.

Preferably, A peripheral portion of the distal end of the drill is formed at a side thereof close to the other main cutting edge with an outer peripheral cutting edge which extends at an acute angle relative to an outer periphery of the drill as seen from an axial direction of the drill. This outer peripheral cutting edge has a proximal portion which is disposed at a location preceding or receding from the other main cutting edge in the drill rotation direction.

Preferably, at least one rake face, which is formed in the distal end of the drill in association with at least one of the main cutting edges, and the rake face associated with the chisel edge are comprised of the same twisted curved surface.

As mentioned above, according to the present invention, there are provided the single chisel edge, extending only between the center of the distal end of the drill and one of the first and second main cutting edges, and the rake face associated with the chisel edge, and preferably, the non-chisel-edge-forming portion is formed between the center of the distal end of the drill and the other main cutting edge. Accordingly, the sharpness of the chisel edge, or the sharpness of the drill can be improved, and the strength and rigidity of a central part of the drill can be ensured.

Preferably, the peripheral portion of the distal end of the drill has its distal end surface which is formed, at the side thereof close to the one main cutting edge and at the location receding from one of the main cutting edges in the drill rotation direction, with the non-cutting-edge-forming portion, and the outer peripheral surface of the peripheral portion is disposed in slide contact with the inner peripheral surface of the machined bore. Accordingly, it is possible to improve the edge stability of the outer peripheral cutting edge, which is formed in the peripheral portion of the distal end of the drill at the side thereof close to the other main cutting edge. This makes it possible to prevent the machined bore from being enlarged, and to improve the service life of the drill. More preferably, since the outer peripheral cutting edge forms an acute angle between itself and the outer periphery of the drill as seen from the drill axis direction, the flow of the machined material is prevented from flowing from the radially inward of the machined bore to the outward thereof, so that generation of burrs can be positively prevented.

Preferably, at least one rake face formed in the drill tip end in association with at least one main cutting edge and the rake face associated with the chisel edge are both comprised of the same twisted curved surface. This makes it easy to perform the production and regrinding of the drill, and hence costs for the production and maintenance of the drill can be lowered, and the cutting edges can be always maintained at appropriate conditions.

BEST MODE OF CARRYING OUT THE INVENTION

Referring to FIGS. 1 to 4, a drill of a first embodiment of the present invention, for forming a bore (not shown) in a workpiece (not shown), comprises first and second main cutting edges or cutting lips 1 and 2 for cutting that part (hereinafter referred to as intermediate portion of the machined bore) of the workpiece which corresponds to an intermediate portion of the bore to be machined in the radial direction of the bore. These main cutting edges are formed in the distal end of the drill, respectively. The half point angles or half vertical angles $\gamma_1$ and $\gamma_2$ of the first and second main cutting edges 1 and 2 are set to the same angle, and offset amounts $\delta_1$ and $\delta_2$ of these main cutting edges relative to the drill center are also set to the same amount. The first-main-cutting-edge-forming portion of the distal end of the drill has one side thereof, with respect to the main cutting edge 1, formed with a rake face 10, and another side thereof formed with a flank face. Similarly, the second-main-cutting-edge-forming portion of the drill distal end is formed with a rake face and a flank face.

Figure 1:
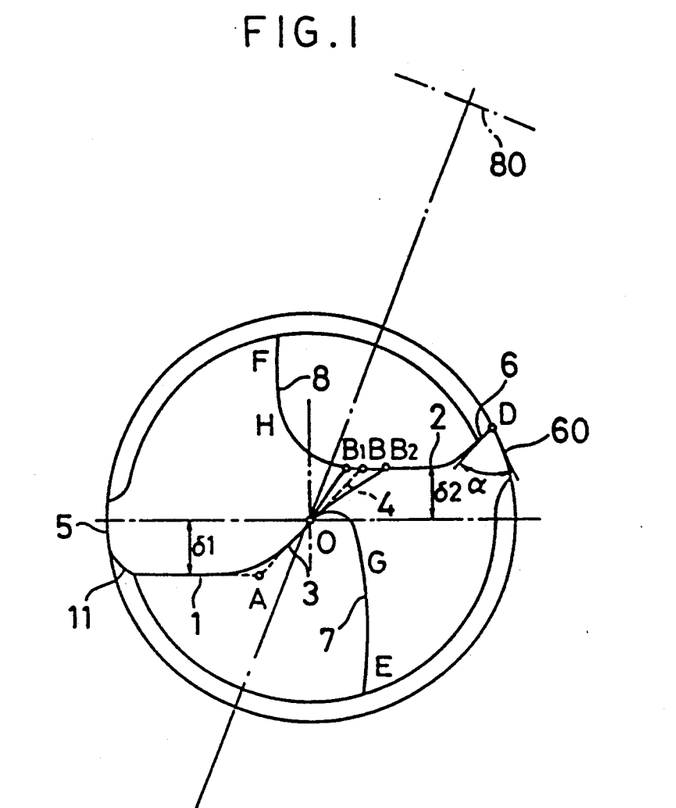
FIG. 1 is a plan view showing a drill according to a first embodiment of the present invention, as seen from the distal end of the drill.
Figure 2:
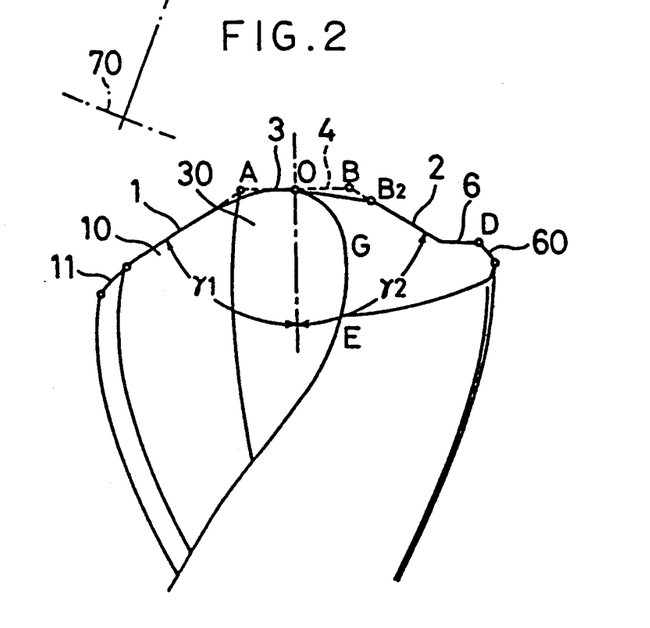
FIG. 2 is a fragmentary front view showing the distal end portion of the drill of FIG. 1.
Figure 3:
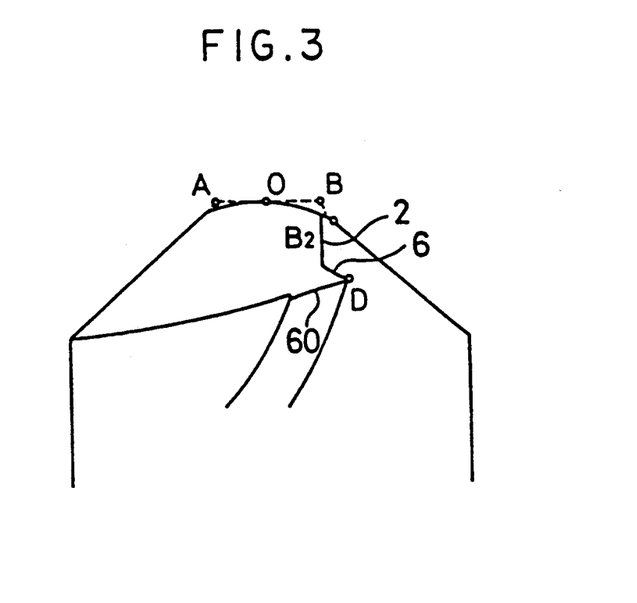
FIG. 3 is a fragmentary right side view showing the distal end portion of the drill.
Figure 4:
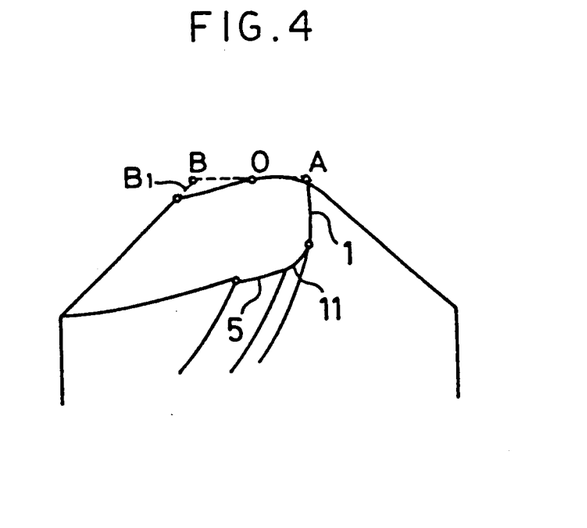
FIG. 4 is a fragmentary left side view showing the distal end portion of the drill.
Figure 5:
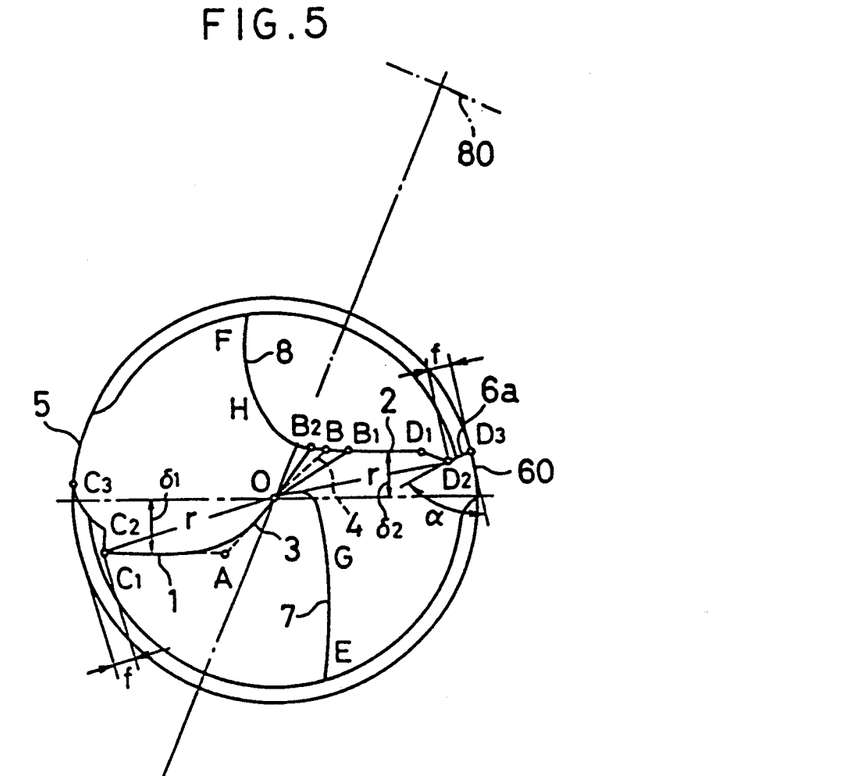
FIG. 5 is a plan view showing a drill according to a second embodiment of the present invention, as seen from the distal end of the drill.
Figure 6:
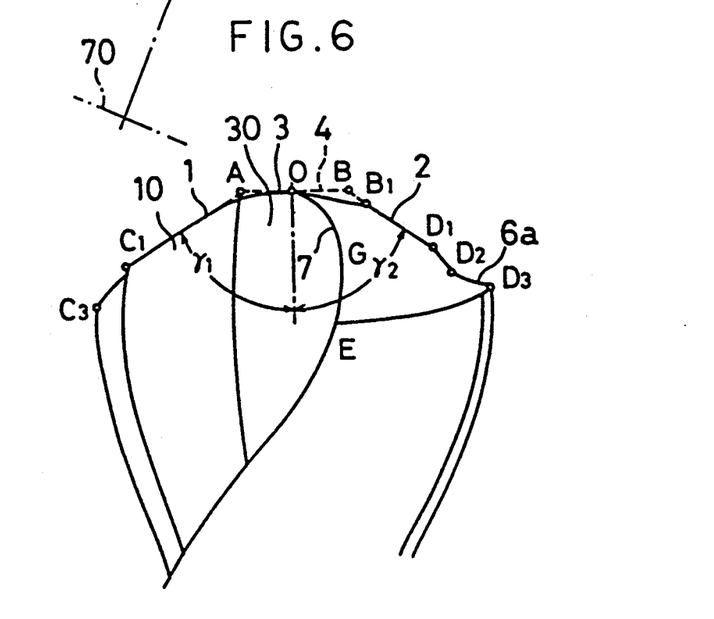
FIG. 6 is a fragmentary front view showing the distal end of the drill of FIG. 5.
Figure 7:
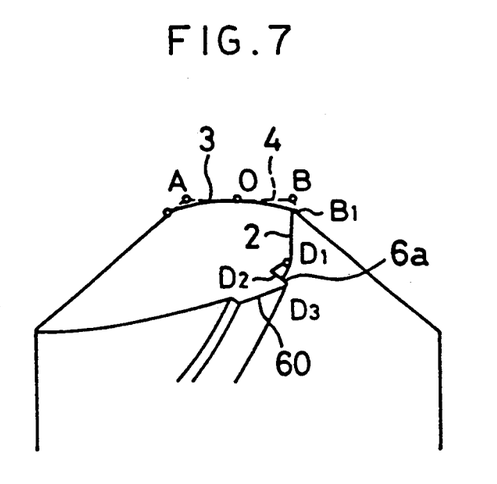
FIG. 7 is a fragmentary right side view showing the distal end of the drill.
Figure 8:
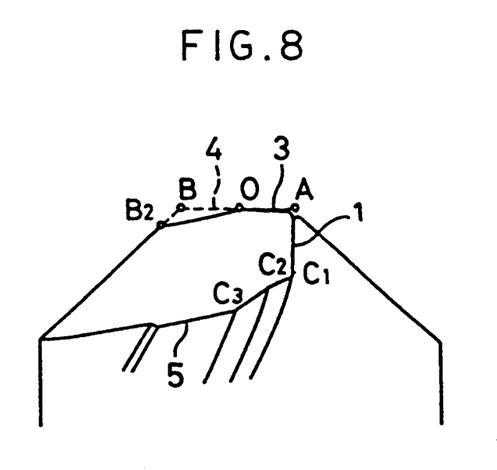
FIG. 8 is a fragmentary left side view showing the distal end of the drill.

Formed in the distal end of the drill in continuity with the first main cutting edge 1 is a single chisel edge 3 for cutting a central part of the machined bore, which chisel edge extends from the center O of the distal end of the drill to the radially inner end of the first main cutting edge 1. In association with the chisel edge 3, the chisel-edge-forming portion has one side thereof formed with a rake face 30, and another side thereof formed with a flank face. The rake face 30 is comprised of a twisted curved surface whose lead is the same as that of the rake face 10 associated with the first main cutting edge 1. In the vicinity of the intersection A of an extension line of the first main cutting edge 1 and that of the chisel edge 3, the first main cutting edge 1 and the chisel edge 3 are rounded off or chamfered, respectively, so as to prevent these edges 1 and 3 from being broken off in the course of drilling process, and make it easy to grind the drill flute or groove during manufacturing process of the drill.

The first main cutting edge 1 terminates at a predetermined radial position located inwardly of the outer periphery of the drill. The peripheral portion of the drill tip end is formed, at its first-main-cutting-edge side, with a margin portion 5 which has an outer peripheral surface thereof disposed in contact with the inner peripheral surface of the machined bore and serving as a guide shoe. The margin portion 5 is provided at its drill-tip-end-face side with a non-cutting-edge-forming portion (cutting-edge-removed portion 11. This cutting-edge-removed portion 11 is provided by, for example, rounding off or chamfering that part of a cutting edge, including the first main cutting edge 1 and extending up to the drill outer periphery, which extends radially outwardly of the outer end of the first main cutting edge. A leading edge (the cutting-edge-removed portion 11) of the margin portion 5 is located at a location receding from the first main cutting edge 1 in the drill rotation direction (anticlockwise direction in FIG. 1). The circumferential length and axial length (area with with the margin portion contacts with the inner peripheral surface of the machined bore) are respectively set to values enough to permit the margin portion 5 to resist a combined force of cutting resistances generated during the course of drilling.

A face 7, which cooperates with the rake face 10 associated with the first cutting edge 1 to define a chip discharge flute, is formed in the drill tip end in facing relation to the rake face 10. The flute defining face 7 is formed into an appropriate shape for preventing the face from interfering with a flute grinding wheel (not shown) which rotates around the rotary axis shown by a one dotted chain line 70 in FIG. 1, and for preventing the flute-defining-face-forming portion of the drill tip end being lowered in strength. The upper edge of the flute defining face 7 is shown by the curve OGE in FIG. 1.

Upper edges of the flank faces respectively associated with the first and second main cutting edges 1 and 2 are removed at a central part of the drill tip end at the side close to the second main cutting edge, to thereby form a non-chisel-edge-forming portion (chisel-edge-removed portion) of a tringular plane $B_1OB_2$. In other words, the chisel edge associated with the second main cutting edge and having a cutting function is removed. In FIG. 1, reference numeral 4 denotes a hypothetical chisel edge associated with the second main cutting edge 2 and represented by the intersection OB of extension planes of the aforesaid two flank faces.

An outer peripheral cutting edge 6 for cutting the peripheral portion of the machined bore is formed in the peripheral portion of the second-main-cutting-edge-forming portion of the drill tip end in such a manner that the edge 6 projects from the second main cutting edge 2 in the drill rotation direction and is continuous with the radially outer end of the second main cutting edge 2. The connecting portion (the proximal portion of the outer peripheral cutting edge) of the outer peripheral cutting edge 6 and the second main cutting edge 2 is rounded off. As seen from the axial direction of the drill, the outer peripheral cutting edge 6 extends at a predetermined angle $\alpha$ relative to the outer periphery of a margin portion 60 which is formed at the periphery of the drill tip end in association with the second main cutting edge. From the viewpoint of preventing burrs caused by the outer peripheral cutting edge 6, it is desirable to set the predetermined angle $\alpha$ to a small value. On the other hand, if the predetermined angle $\alpha$ is set to an excessively small value, various inconveniences are encountered. For example, the mechanical strength of the outer-cutting-edge-forming portion of the drill is lowered, and a machining process of the chip discharge flute becomes difficult. Further, the combined force of cutting resistances generated during drilling process no longer exerts along the direction from the drill center toward the guide shoe, so that the edge stability is spoiled. In this respect, the predetermined angle $\alpha$ is set to an acute angle, preferably, about 60 to 75 degrees. Meanwhile, the distance between the outer periphery of the margin portion 5 and the drill center (i.e., the radius of the margin portion) is set to a value slightly smaller than the distance between the outer peripheral cutting edge 6 and the drill center (i.e., the radius of the outer peripheral cutting edge), so that the margin portion 5 is smooothly slidable along the inner peripheral surface of the machine bore during the drilling process.

Moreover, a face 8, which cooperates with the rake face associated with the second main cutting edge 2 to define a chip discharge flute, is formed in the drill tip end in facing relation with the rake face. As in the face 7 associated with the first main cutting edge 1, the flute defining face 8 is formed into a shape which prevents the interference with a flute grinding wheel which rotates around a rotary axis 80, and prevents the decrease of strength of the flute-defining-face-forming portion of the drill. In FIG. 1, an upper edge of the flute defining face 8 is shown by the curve $B_1HF$.

In the following, the operation of the drill of FIGS. 1 to 4 will be explained.

During the drilling process, an intermediate portion of a bore to be machined is cut by the first and second main cutting edges 1 and 2 (two-blade edge) of the drill, whereas a center part of the machined bore is cut by means of the single chisel edge 3 (single-blade edge). At this time, a cutting speed at the central part of the machined bore is relatively small, so that the service life of the drill will never be spoiled due to the cutting operation regarding the central part of the machined bore with the single-blade edge. Further, machined material smoothly slidably passes over the rake face 30 of the chisel-edge-forming portion, so that the sharpness of the chisel edge 3 is ensured. The second-main-cutting-edge side of the drill, from which the chisel edge corresponding to the hypothetical chisel edge 4 is removed, does not function to cut the central part of the machined bore, but functions to guarantee the strength and rigidity of the drill central part. Moreover, a peripheral portion of the machine bore is cut by means of the outer peripheral cutting edge 6. At this time, the machined material, which slidably passes over the outer peripheral cutting edge 6, forming an acute angle between itself and the outer periphery of the drill, flows to the inward of the machine bore. As a result, no burr is generated at the exit of the machined bore. The first-main-cutting-edge side of the drill from which the edge is removed over a region from the radially outer end of the main cutting edge 1 to the outer periphery of the drill, does not function to cut the peripheral portion of the machined bore.

During the course of drilling, the margin portion 5 smoothly slides along the inner peripheral surface of the machined bore, to thereby function as the guide shoe, and serves to receive the combined force of cutting resistances, thereby maintaining the good edge stability of the outer peripheral cutting edge 6. Consequently, the machined bore is prevented from being excessively enlarged, so that the machining accuracy is guaranteed. Further, no substantial runout of the drill from its axis is found, so that the straight machined bore is formed, with the service life of the drill edges prolonged.

After completion of drilling, the drill is re-ground, where required. At that time, since the rake faces of the drill are comprised of twisted curved surfaces having the same lead, appropriate cutting edges can be provided solely by re-grinding the flank faces of the distal end of the drill. For the same reason, the drill can be easily manufactured, and costs for the drill production can be lowered.

Next, a drill of a second embodiment of the present invention will be explained.

The drill of the present embodiment contemplates improving its durability at high cutting speeds. To this end, the first-main-cutting-edge side and the outer peripheral cutting edge of the drill are formed into different shapes from those of the drill of the first embodiment. However, the fundamental construction of the drill is similar to that of the first embodiment, so that elements common to both the embodiments will be shown by like reference numerals, and descriptions thereof will be omitted.

Referring to FIGS. 5 to 8, the leading edge of the margin portion 5, corresponding to the cutting-edge-removed portion 11 of FIG. 1, extends at approximately right angles relative to the first main cutting edge 1 in a manner receding from the same edge 1 in the drill rotation direction from a radially outer end $C_1$, located at a location remote from the drill tip end center 0 by a radial distance r, of the first main cutting edge 1 to an intermediate point $C_2$. The leading edge further obliquely extends from the intermediate point $C_2$ to a point $C_3$ on the outer periphery of the drill, in a manner receding in the drill rotation direction. As in the element 11 of FIG. 1, a cutting edge removed portion $C_1C_2C_3$ is formed with no cutting edge, and has not a cutting function. This cutting edge removed portion $C_1C_2C_3$ may be provided by cutting off relevant part of cutting edges, including the first main cutting edge 1 and formed in the peripheral portion of the drill tip end, in substantially the same manner as in the case of the corresponding element 11 shown in FIG. 1. The radial size (the radial distance between the outer end $C_1$ of the first main cutting edge and the outer periphery $C_3$ of the drill) of the cutting edge removed portion $C_1C_2C_3$ is set to the same value as a finishing allowance f of the machined bore.

The outer-peripheral-edge-forming portion of the drill tip end at the side thereof close to the second main cutting edge 2 is formed into a shape which is indicated by the curve $D_1D_2D_3$. Namely, the outer-peripheral-cutting-edge-forming portion obliquely extends from the radially outer end $D_1$ of the second main cutting edge 2 to the intermediate point $D_2$ which is located at a position receding from the second main cutting edge in the drill rotation direction, and further extends from the intermediate point $D_2$ up to the point $D_3$ on the outer periphery of the drill. Provided between the intermediate point $D_2$ and the point $D_3$ is an outer peripheral cutting edge, which corresponds to the element 6 of FIG. 1.

More specifically, the intermediate point $D_2$ is separated radially from the drill center 0 by the same distance r as the radial distance r between the outer end $C_1$ and the drill center 0. The curved part $D_1D_2$ at which the second main cutting edge 2 is connected with the outer periphery cutting edge 6a has a predetermined flank angle (FIG. 6), so as not to achieve a substantial cutting function. The outer peripheral cutting edge 6a forms a predetermined acute angle a (preferably, about 60 to 75 degrees) between itself and the outer periphery of the margin portion 60 at the side thereof close to the second main cutting edge, as seen from the axial direction of the drill.

In the following, the operation of the drill according to the second embodiment shown in FIGS. 5 to 8 will be explained.

The operation and advantages of the drill of this embodiment are basically the same as those of the first embodiment. Namely, the cutting process of the central part of the bore to be machined is carried out by means of the single chisel edge 3 (one-blade edge), and the intermediate part of the machined bore is cut by the first and second main cutting edges 1 and 2 (two-blade edge). The sharpness of the chisel edge which is provided in the chisel-edge-forming portion having the rake face 30 is excellent, and the strength and rigidity of the drill center part provided with the chisel edge removed portion are ensured. Moreover, suppression of enlargement of the bore size, etc., are achieved by the margin portion which is provided at the side, close to the first main cutting edge, of the peripheral portion of the drill tip end, the margin portion having a cutting edge removed portion and arranged to achieve a guide shoe function. Meanwhile, the connecting part $D_1D_2$, interposed between the second main cutting edge 2 and the outer peripheral cutting edge 6a and having a predetermined flank angle, does not offer a cutting function.

As distinct from the first embodiment adapted to cut the peripheral portion of the machine bore with the use of the outer peripheral cutting edge 6 which precedes the second main cutting edge 2, the outer peripheral edge 6a receding from the second main cutting edge does not contribute rough machining of the peripheral portion of the machined bore, and solely serves to perform finish machining (finishing allowance f) of the peripheral portion of the machined bore. The rough machining of the peripheral portion of the bore is carried out by the outer end of the first main cutting edge 1. Prior to the finish machining process by the outer peripheral cutting edge 6a, the rough machining is carried out by the first and second main cutting edges 1 and 2, and the workpiece is softened by cutting heat which is generated in the course of the rough machining. As a result, the outer peripheral cutting edge 6a serves to cut, with the minute finishing allowance f, that part of the thus softened workpiece which corresponds to the peripheral portion of the machined bore. Thus, the outer peripheral cutting edge 6a undergoes only small cutting resistances during the drilling. Since the cutting heat is transferred to the edge body, no substantial increase in temperature of the edge occurs. Thus, the service life of the drill can be prolonged.

Moreover, as in the first embodiment, the flow of machined material directing from the inward of the machined bore to the outward thereof is prevented by the outer peripheral cutting edge 6a which extends at an acute angle relative to the outer periphery of the drill, thereby preventing occurrences of burrs. Also, regrinding of the drill can be easily carried out.

Figure 9:
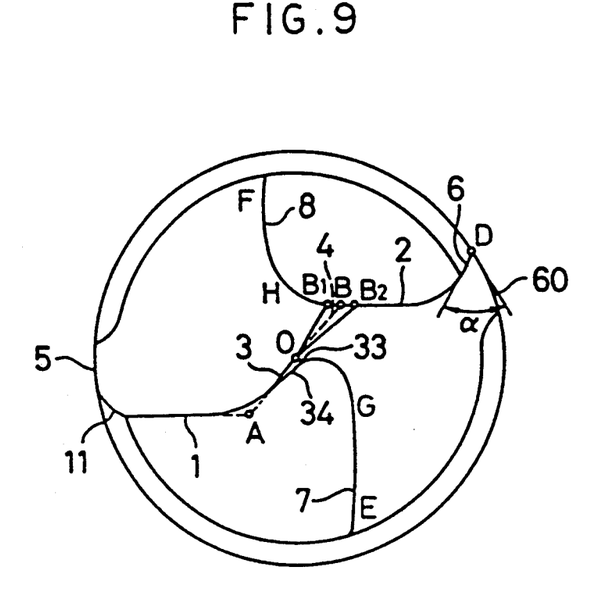
FIG. 9 is a plan view showing a modification of the drill of the first embodiment, as seen from the distal end of the drill.
Figure 10:
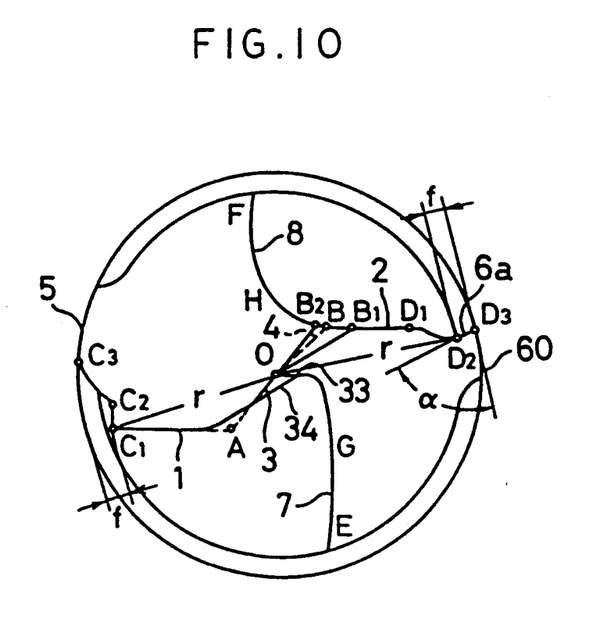
FIG. 10 is a view, similar to FIG. 9, showing a modification of the drill of the second embodiment.

FIGS. 9 and 10 respectively show drills according to modifications of the first and second embodiments. These modifications contemplate to protect the chisel edge, as in a twist drill disclosed in U.S. Pat. No. 4,688,972. However, as distinct from this prior art, the modification relate to a drill provided with a single chisel edge.

To this end, in the respective drills shown in FIGS. 9 and 10, the chisel-edge-forming portion of the distal end of each drill, provided with the single chisel edge 3, is formed at one side thereof with a primary rake face 33, serving as the seat for the built-up edge, and a secondary rake face 34 having a positive rake angle. According to the above arrangement, the chisel edge 3 serving as the built-up edge is stabilized, thereby achieving protection of the edge.

The present invention is not limited to the foregoing first and second embodiments and the two modifications thereof, but may be modified in various ways.

For instance, the drill tip end may be comprised of a cemented carbide chip for ease of production of the drill.

Although the rake face comprised of a twisted curved surface is formed to obtain a helical drill flute in the embodiments and their modifications, the rake face may be comprised of conical surface, cylindrical surface and the like, to thereby provide the drill flute of a straight groove type.

I claim:

1. A drill, comprising:
   first and second main cutting edges respectively formed in a distal end of the drill, said first and second cutting edges having the same half point angle, and having the same offset amount relative to a center of the drill;
   a single chisel edge formed in the distal end of the drill and extending between the center of the distal end of the drill and one of said first and second main cutting edges;
   a rake face formed in the distal end of the drill in association with said chisel edge; and
   wherein a peripheral portion of the distal end of the drill has a drill distal end surface thereof, which is formed at a side thereof close to at least one of said first and second main cutting edges with a non-edge-forming portion, the peripheral portion having, at the side thereof close to said one main cutting edge, an outer peripheral surface which is disposable in slide contact with an inner peripheral surface of a machined bore.

2. A drill according to claim 1, wherein a non-chisel-edge-forming portion is provided between the center of the distal end of the drill and the other of said first and second main cutting edges.

3. A drill according to claim 1, wherein said rake face includes at least one of a primary rake face having a positive primary rake angle, and a second rake face having a positive secondary rake angle.

4. A drill according to claim 1, wherein said non-cutting-edge-forming portion is disposed at a location receding from said one main cutting edge in a direction along which the drill rotates.

5. A drill according to claim 1, wherein a radial distance between a radially inner end of said non-cutting-edge-forming portion and the outer periphery of the drill is set to a length which is equal to a finishing allowance of a bore to be machined.

6. A drill according to claim 1, wherein at least one rake face is formed in the distal end of the drill in association with at least said one main cutting edge, and said at least one rake face and said rake face associated with said chisel edge are comprised of the same twisted curved surface.

7. A drill, comprising:
first and second main cutting edges respectively formed in a distal end of the drill, said first and second cutting edges having the same half point angle, and having the same offset amount relative to a center of the drill;
a single chisel edge formed in the distal end of the drill and extending between the center of the distal end of the drill and one of said first and second main cutting edges;
a rake face formed in the distal end of the drill in association with said chisel edge; and
wherein a peripheral portion of the distal end of the drill is formed at a side thereof close to the other of said first and second main cutting edges, with an outer peripheral cutting edge extending at an acute angle relative to an outer periphery of the drill as seen from an axial direction of the drill.

8. A drill according to claim 7, wherein the outer peripheral cutting edge is disposed at a location preceding said other main cutting edge in the drill rotation direction.

9. A drill according to claim 7, wherein the outer peripheral cutting edge is disposed at a location receding from said other main cutting edge in the drill rotation direction.

10. A drill according to claim 9, wherein a radial distance between a radially inner end of said non-cutting-edge-forming portion and the outer periphery of the drill is set to a length equal to a finishing allowance of a bore to be machined, and a radial length of said outer peripheral cutting edge is set to a value equal to the finishing allowance of the bore to be machined.

11. A drill according to claim 9, wherein a flank angle is provided in that part of the distal end of the drill at which a radially outer end of said other main cutting edge is connected with a radially inner end of said outer peripheral cutting edge.

* * * * *